United States Patent [19]
Harding

[11] Patent Number: 5,602,893
[45] Date of Patent: Feb. 11, 1997

[54] ARRANGEMENT FOR MEASURING THE PULSE TRANSFER SPECTRUM OF ELASTICALLY SCATTERED X-RAY QUANTA

[75] Inventor: Geoffrey Harding, Hamburg, Germany

[73] Assignee: U.S. Philips Corporation, New York, N.Y.

[21] Appl. No.: 560,238

[22] Filed: Nov. 21, 1995

[30] Foreign Application Priority Data

Nov. 24, 1994 [DE] Germany .......................... 44 41 843.4

[51] Int. Cl.⁶ .................................................. G01N 23/201
[52] U.S. Cl. ............................................ 378/86; 378/147
[58] Field of Search ................................. 378/86, 88, 147, 378/149

[56] References Cited

U.S. PATENT DOCUMENTS 5,231,652  7/1993  Harding ................................. 378/86
5,394,453  2/1995  Harding ................................. 378/86

FOREIGN PATENT DOCUMENTS 4222227  1/1994  Germany.

Primary Examiner—David P. Porta
Assistant Examiner—David Vernon Bruce
Attorney, Agent, or Firm—Jack D. Slobod

[57] ABSTRACT

The invention relates to an arrangement for measuring the pulse transfer spectrum of X-ray quanta using two polychromatic X-ray sources and a detector arrangement which measures the scattered X-ray quanta in an energy-resolved fashion. A secondary diaphragm device, arranged between the examination zone in which the object whose pulse transfer spectrum is to be determined is situated and the detector device, ensures that each detector element of the detector device can be struck by scattered radiation only at a comparatively accurately determined scatter angle. The arrangement in accordance with the invention enables very fast inspection of an object.

10 Claims, 4 Drawing Sheets

5,602,893

ARRANGEMENT FOR MEASURING THE PULSE TRANSFER SPECTRUM OF ELASTICALLY SCATTERED X-RAY QUANTA

FIELD OF THE INVENTION

The invention relates to an arrangement for measuring the pulse transfer spectrum of elastically scattered X-ray quanta from an examination zone, comprising
- an X-ray source for generating polychromatic X-rays,
- a detector which detects the scattered X-ray quanta and which comprises a plurality of annular detector elements which concentrically enclose a detector centre in a detector plane,
- a primary diaphragm device which is arranged between the X-ray source and the examination zone irradiated by the X-rays and which comprises a primary slit aperture for forming a primary radiation beam,
- a secondary diaphragm device which is arranged between the examination zone and the detector and which comprises at least one secondary slit aperture, the primary and secondary slit apertures having essentially a semi-annular shape and being arranged coaxially with respect to a beam axis connecting the X-ray source and the detector center.

BACKGROUND OF THE INVENTION

Such an arrangement is known from German Application DE-A 42 22 227 and is capable of identifying given substances, notably crystalline substances (explosives), in a piece of luggage on the basis of their pulse transfer spectrum. The polychromatic X-rays generated by a single X-ray source are shaped so as to form a conical primary beam by means of a slit aperture in a primary diaphragm plate. The radiation scattered in the examination zone is incident, via slits of a secondary diaphragm device which may consist of one or more diaphragm plates, on a detector consisting of a plurality of elements. In the case of a half angle of aperture of the primary beam of 0.0309 radians, a distance of 1,187 mm between the primary diaphragm plate and the radiation source, and a thickness of the examination zone of 500 mm in the radiation direction, the diameter of the primary radiation beam at approximately the center of the examination zone (i.e. at a distance of 250 mm from the primary diaphragm plate) amounts to approximately 90 mm. Because, generally speaking, the objects to be examined have substantially larger dimensions, it is necessary to perform a meander-like scanning motion during which all areas of the object are successively examined.

SUMMARY OF THE INVENTION

It is an object of the invention to construct an arrangement of the kind set forth in such a manner that the examination of an object becomes less time consuming.

This object is achieved in accordance with the invention in that there is provided a second X-ray source which is situated at substantially the same distance from the detector plane as the first X-ray source and is arranged in such a manner that a second beam axis which connects the second X-ray source and the detector center intersects the first beam axis at an angle and constitutes a pair of beam axes in conjunction therewith, that with both beam axes there are associated primary and secondary slit apertures, and that all primary and secondary slit apertures extending around the first beam axis open towards the plane defined by the pair of beam axes in the opposite direction in comparison with the primary and secondary slit apertures extending around the second beam axis, both ends of each semi-annular slit aperture being situated approximately in the plane defined by the pair of beam axes.

Whereas in the known arrangement an object area having a width of only approximately 90 mm can be simultaneously covered by a primary radiation beam, this area is widened in the arrangement in accordance with the invention. Because the slit apertures of the primary diaphragm device essentially have a semi-annular shape, primary radiation beams are formed which irradiate the examination zone on the generated surfaces of semi-cones which are adjacently situated in an offset manner. The secondary slit apertures, also having a semi-annular shape, map the examination zone on the detector.

In one embodiment the diameters of the primary slit apertures are chosen so that the first primary radiation beam, formed by primary slit apertures extending around the first beam axis, in the examination zone adjoins the second primary radiation beam, formed by primary slit apertures extending around the second beam axis. This offers the advantage that it minimizes the examination zone area which is not irradiated between two primary radiation beams which are emitted by different X-ray sources and whose scattered radiation is incident on the same detector. Because the angle at which two beam axes intersect is very small, it is practically of no importance where in the examination zone, i.e. at which distance from the detector plane, the two primary radiation beams adjoin one another.

Preferably, the primary and/or the secondary slit apertures are provided in a respective single, flat diaphragm plate, thus allowing for particularly simple manufacture of the diaphragm devices. The diaphragm plates consist of a material which absorbs X-rays and/or have a thickness such that X-rays can pass only via the slit apertures.

In an embodiment the secondary slit apertures are arranged so that the scattered radiation of the first primary radiation beam, scattered essentially in a plane of the examination zone which extends parallel to the detector plane, is incident on the same annular element of a detector as the scattered radiation of the second primary beam which is scattered in the same plane in the examination zone. It is thus ensured that the scattered radiation incident on a given annular element of a detector is scattered at a comparatively accurately defined scatter angle in the examination zone.

For the same reasons it is necessary to suppress scattered radiation which encloses at a comparatively large angle relative to a plane containing a beam axis. To this end, in a further embodiment of the invention two collimator devices which are associated with a respective beam axis and which comprise lamellae which absorb X-rays and are situated in planes containing a beam axis are arranged between the examination zone and the detector.

Moreover, in order to prevent scattered radiation of the first primary radiation beam from being incident on the detector half intended for the detection of the scattered radiation of the second primary radiation beam, the lamellae of the two collimator devices are separated from one another by a metallic partition which extends in a plane in which the two beam axes are situated. The metallic partition consists of a material which absorbs X-rays, like the lamellae of the collimator device.

A further embodiment of the invention, comprises at least one further detector and the primary diaphragm device comprises two slit apertures for each detector. The larger the number of detectors, the larger the number of semi-conical primary radiation beams adjacently irradiating the examination zone may be, and hence the wider the simultaneously irradiated zone will be.

In a preferred embodiment all primary and secondary slit apertures and all detectors are arranged in such a manner that all beam axes connecting the two X-ray sources to the detector centres are situated in a single plane. This embodiment is advantageous with a view to maximizing the width of the zone simultaneously irradiated by a plurality of primary radiation beams.

In a particularly attractive embodiment of the invention, moreover, there are provided four detectors and, the primary diaphragm device comprises eight semi-annular slit apertures. A zone having a width of approximately 720 mm can thus be simultaneously inspected. Because, generally speaking, pieces of luggage having a maximum width of 700 mm are to be inspected, in this embodiment the meander-like two-dimensional scanning motion can be dispensed with. It suffices to perform a one-dimensional scanning motion so as to perform complete inspection of such a piece of luggage; on the one hand this makes it possible to use a simpler device for moving the piece of luggage relative to the inspection device and on the other hand a substantial saving in time is achieved.

These and other aspects of the invention will be apparent from and elucidated with reference to the embodiments described hereinafter.

DESCRIPTION OF THE INVENTION

Figure 1:
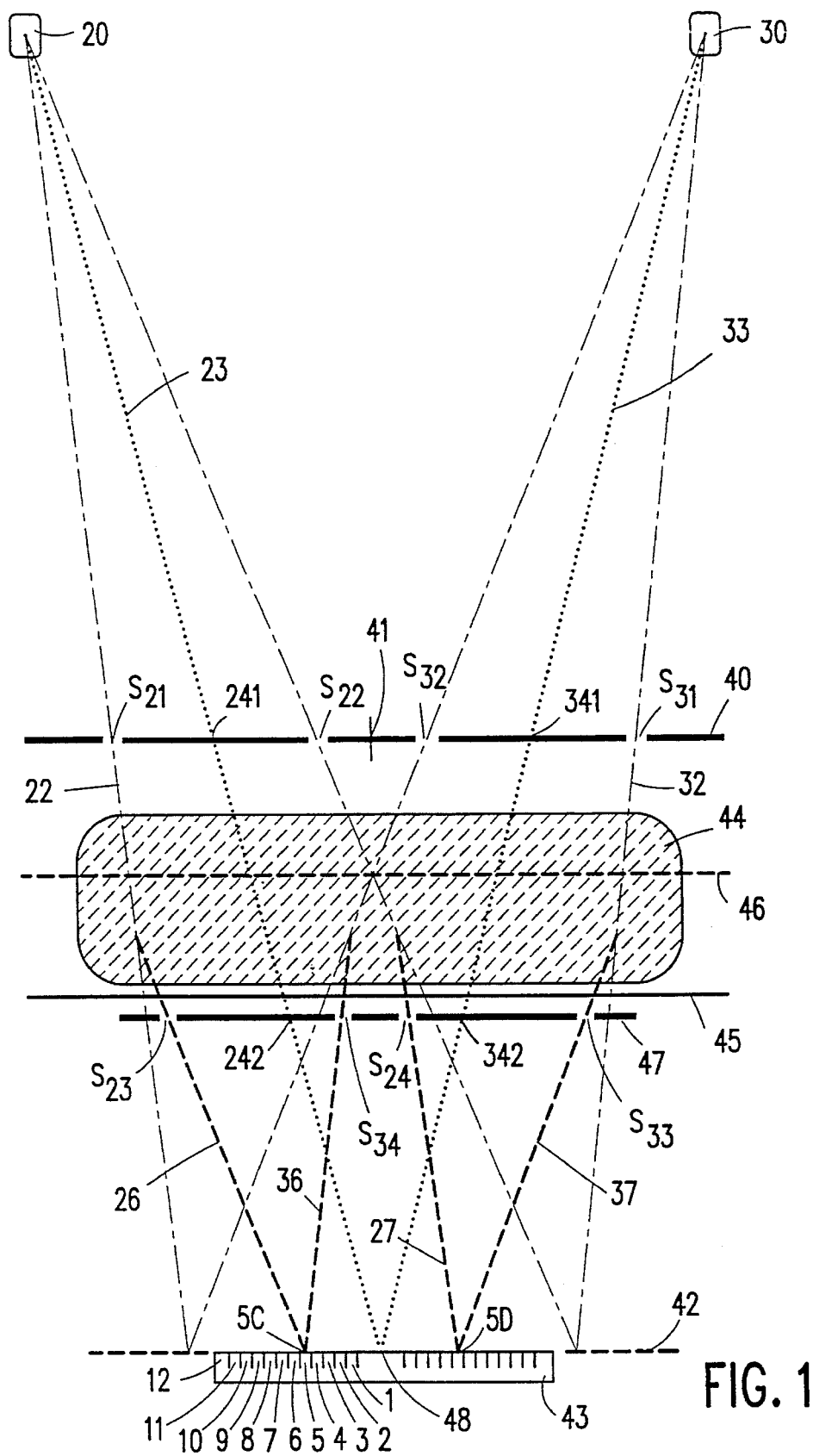
FIG. 1 shows diagrammatically a first embodiment of the invention.
Figure 6:
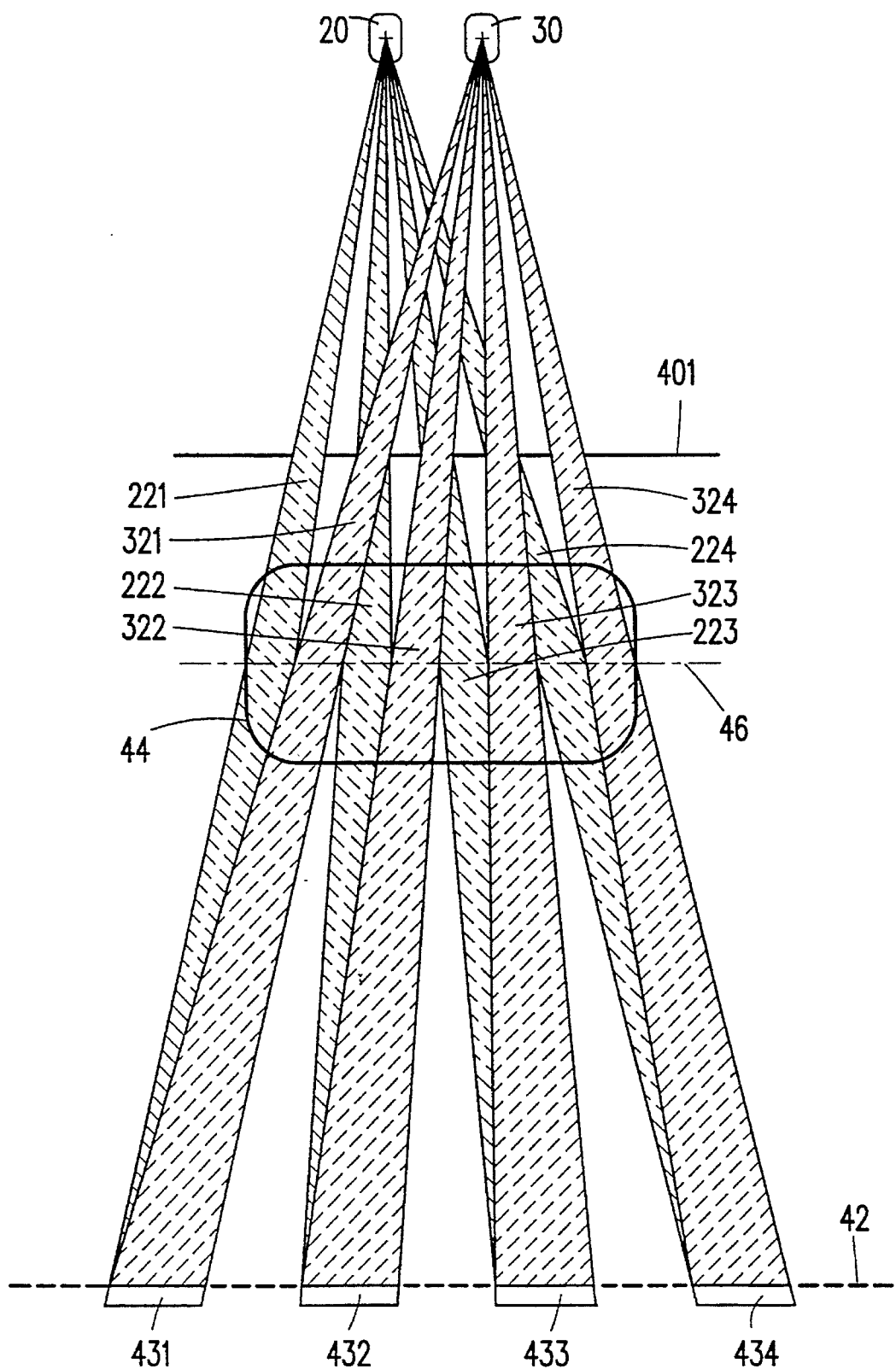
FIG. 6 shows diagrammatically an arrangement comprising four detectors.

The embodiments of the FIGS. 1 and 6 are not shown to scale, for the sake of clarity, the dimensions in the horizontal direction are strongly exaggerated in comparison with the dimensions in the vertical direction.

The reference numerals 20 and 30 in FIG. 1 denote two similar X-ray sources for generating polychromatic X-rays. The X-rays are incident on a flat primary diaphragm plate 40 which comprises, as will be described in detail hereinafter with reference to FIG. 2, two essentially semi-annular slit apertures 21 and 31, so that two primary radiation beams 22 and 32 are formed subsequent to the primary diaphragm plate 40. In FIG. 1 only the positions of the primary slit apertures 21 and 31 which are denoted by the references $S_{21}$, $S_{22}$ and $S_{31}$, $S_{32}$, respectively, in FIG. 2 can be recognized.

The examination zone in which the object 44 to be examined, for example a suitcase, is arranged is bounded by the primary diaphragm plate 40 and a plate 45 which extends parallel thereto and which is transparent to X-rays, for example a conveyor belt which is situated further from the X-ray sources 20 and 30 than the primary diaphragm plate 40 and is situated at a distance therefrom which amounts to, for example 500 mm. In the plane 46, situated approximately halfway between the two plates 40 and 45 in the present example, the primary radiation beams 22 and 32 adjoin one another. The two primary radiation beams 22 and 32 are shaped as the generated surface of a respective semi-cone, one of the semi-cones projecting from the plane of drawing whereas the other semi-cone projects into the plane of drawing.

Figure 3:
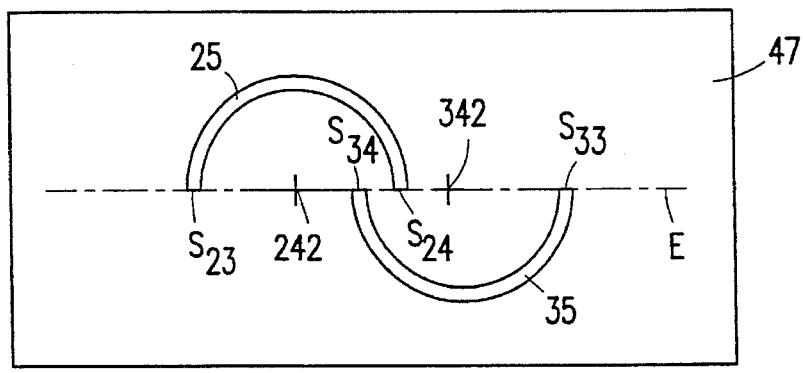
FIG. 3 shows a simple embodiment of the secondary diaphragm device.

Between the plate 45 and the detector 43 there is arranged a flat secondary diaphragm plate 47 which comprises, as is shown in FIG. 3 to be described hereinafter, essentially semi-annular secondary slit apertures 25 and 35. In FIG. 1 only the areas of the slit apertures 25 and 35 which are denoted by the references $S_{23}$, $S_{24}$ and $S_{33}$, $S_{34}$, respectively in FIG. 3 can be recognized.

The detector device in the embodiment shown consists of a single detector 43 which is situated in a detector plane 42 extending parallel to the primary diaphragm plate 40 and the secondary diaphragm plate 47. The detector comprises twelve annular detector elements 1 . . . 12 which are concentrically arranged around a detector center 48. The center 48 is the point of intersection of two beam axes 23 and 33, extending from a respective one of the X-ray sources 20 and 30 and constituting a pair of beam axes. The beam axes 23 and 33 intersect the primary diaphragm plate 40 at the points 241 and 341, respectively, and the secondary diaphragm plate at the points 242 and 342, respectively. The slits $S_{21}$ and $S_{22}$ are situated at the same distance from the point of intersection 241; similarly, the slits $S_{31}$ and $S_{32}$ are situated at the same distance from the point of intersection 341. The same holds for the slits $S_{23}$ and $S_{24}$ or $S_{33}$ and $S_{34}$ in relation to the points of intersection 242 and 342, respectively. The beam axes 23 and 33 thus extend at the center of the semi-conical primary radiation beams 22 and 32, respectively.

Because the beam axes 23 and 33 intersect at the point 48 in the detector plane 42, only one detector 43 is required so as to detect the scattered radiation of the two primary radiation beams 22 and 32. In the embodiment shown, the primary radiation beam 22 produces scattered rays 26 and 27 which are incident, via the slits $S_{23}$ and $S_{24}$, on the same annular detector element 5 as the scattered rays 36 and 37 produced by the primary radiation beam 32 and incident on the detector element 5 via the slits $S_{33}$ and $S_{34}$. The scattered radiation, produced in the examination zone in a plane which is substantially parallel to the detector plane 42, for example in a zone around the plane 46, is incident on a given annular detector element in the detector plane 42, irrespective of which primary radiation beam 22 or 32 has produced the scattered radiation.

The X-ray sources 20 and 30 are arranged at a distance of 2500 mm from the detector plane 42; the two X-ray sources need not be situated at exactly the same distance therefrom. The distance between the X-ray sources 20 and 30 and the primary diaphragm plate 40 amounts to 1187 mm; the distance between the primary diaphragm plate 40 and the plate 45 amounts to 500 mm. The X-ray sources 20 and 30 are arranged at a distance of approximately 180 mm from one another.

Figure 2:
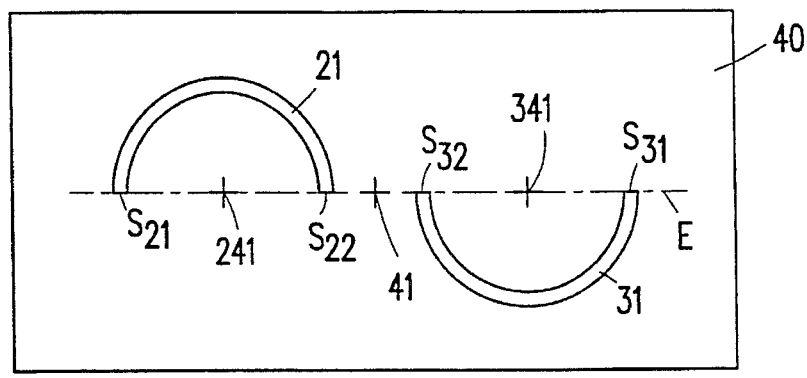
FIG. 2 shows a simple embodiment of the primary diaphragm device.

FIG. 2 is a plan view of the primary diaphragm plate 40. The line E denotes the plane of drawing of FIG. 1 which extends perpendicularly to the primary diaphragm plate 40 and at the same time constitutes the plane defined by the pair of beam axes formed by the beam axes 23 and 33. The points of intersection of the beam axes 23 and 33 with the primary diaphragm plate 40 are denoted by the references 241 and 341, respectively. The Figure shows the semi-annular configuration of the primary slit apertures 21 and 31 which are situated around the centers 241 and 341, respectively, and have the ends $S_{21}$, $S_{22}$ and $S_{31}$, $S_{32}$, respectively, which are situated in the plane denoted by E. The slit apertures 21 and 31 are arranged in such a manner that they open in opposite directions with respect to the plane denoted by E and extend point-symmetrically to the point 41. In the primary diaphragm plate 40 the point 41 occurs as a point of intersection of a straight line which extends perpendicularly to the detector plane 42 (see FIG. 1) in the detector center 48 and which intersects the connecting line between the two X-ray sources 20 and 30 approximately halfway.

FIG. 3 is a plan view of the secondary diaphragm plate 47. The semi-annular secondary slit apertures 25 and 35 also open in opposite directions with respect to the plane denoted by E and extend about the beam axes 23 and 33 (see FIG. 1) whose points of intersection with the secondary diaphragm plate 47 are denoted by the references 242 and 342, respectively, the secondary slit aperture 25 opening towards the plane denoted by E in the same direction as the primary slit aperture 21 of FIG. 2. The ends $S_{23}$, $S_{24}$ and $S_{33}$, $S_{34}$ of the secondary slit apertures 25 and 35, respectively, are also situated in the plane denoted by E.

The primary and secondary slit apertures 21, 31 (see FIG. 2) and 25, 35 (see FIG. 3) need not be exactly semi-circular, but should essentially be semi-annular; slit apertures having a semi-elliptical shape are also feasible. Because of the small half angle of aperture of the X-rays of 0.0309 radians and the large distance of 1187 mm between the X-ray sources 20, 30 and the primary diaphragm plate 40 in practice the primary and secondary slit apertures 21, 31 and 25, 35, will have a semi-annular shape for simplicity of manufacture, even though theoretically a slightly elliptical deformation is required.

Figure 4:
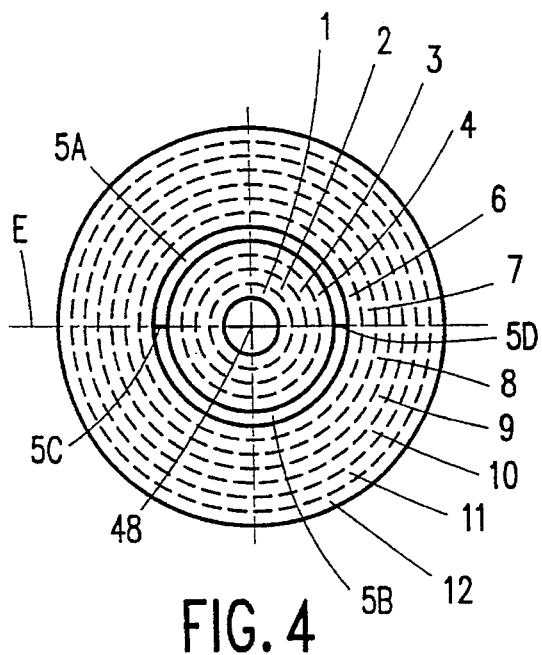
FIG. 4 shows a detector consisting of twelve annular elements.

FIG. 4 is a plan view of a detector which comprises twelve annular elements 1 . . . 12 which concentrically enclose the center 48. The various elements 1 . . . 12 serve to detect the scattered radiation from different parts of the examination zone separately, i.e. to measure the number of X-ray quanta incident thereon in an energy-resolved manner. The parts of the examination zone are formed by layer planes extending parallel to the detector plane 42 (see FIG. 1) and a zone around the respective layer planes.

Because the pulse transfer is proportional to the product of the sine of half the scatter angle and the energy of the elastically scattered X-ray quantum and the scatter angle at which a given detector element 1 . . . 12 detects scattered radiation from the associated part of the examination zone is known, for each detector element 1 . . . 12 a pulse transfer spectrum can be calculated as disclosed in DE-A 42 22 227. This calculation, therefore, will not be elucidated again herein.

The detector element 5, being subdivided into the semi-annular sub-elements 5A and 5B with the points of contact 5C and 5D, detects the scattered rays 26, 27 and 36, 37 (see FIG. 1) in such a manner that the semi-annular sub-element 5A receives only the scattered rays 26 and 27 and the sub-element 5B receives only the scattered rays 36 and 37. More generally speaking, this means that scattered radiation produced by the primary radiation beam 22 (see FIG. 1) is incident only on the detector sub-elements situated above the plane E of the detector shown in FIG. 4, whereas the scattered radiation produced by the radiation beam 32 (see FIG. 1) is incident only on the detector sub-elements situated below the plane denoted by E.

In order to enable exact as possible determination of the pulse transfer spectrum, the scatter angle enclosed by the scattered radiation received by a given detector element relative to the associated primary beam must be defined as accurately as possible. Therefore, a given detector element should only detect scattered radiation for which the scattered ray extends in the plane defined by the primary beam producing it and the beam axis of this primary beam, but at least in a sector-shaped area around this plane. In order to suppress the other scattered radiation, two collimator devices are arranged between the examination zone and the detector. These collimator devices have been omitted in FIG. 2 for the sake of clarity; they are shown in a sectional view in FIG. 5.

The collimator devices essentially consist of a respective half 28, 38 of a tube which has been halved along its central axis and which consists of an X-ray absorbing material. The tube halves 28 and 38 are separated from one another by a metallic partition 49 which absorbs X-rays and which is situated in the plane of drawing of FIG. 1; the tube halves are arranged about the collimator axis 243, 343 wherethrough the beam axes 23, 33, respectively, extend (see FIG. 1). On the inner side of the tube halves 28 and 38 there are provided lamellae 29 and 39, respectively, which are situated at a uniform distance from one another and which are radially aligned with respect to the collimator axes 243, 343, respectively.

The X-ray sources 20 and 30 of FIG. 1 are situated at a distance from one another which corresponds to approximately twice the diameter of a semi-conical primary radiation beam in the plane 46, amounting to approximately 90 mm in the case shown. As can be seen, the beam axes 22 and 32 do not extend perpendicularly to the detector plane 42. In comparison with the scatter angle in the arrangement known from DE-A 42 22 227, where the beam axis extends perpendicularly to the detector plane, the scatter angle is thus reduced by a factor which corresponds to approximately the cosine of the angle between the beam axis and the normal to the detector plane 42. For a maximum possible angle of 15° between beam axis and normal to the detector plane, however, only a negligibly small reduction by approximately 3% of the scatter angle occurs, so that overall the effects on the scatter angle due to the beam axes not being perpendicular to the detector plane 42 can be ignored.

Whereas in the arrangement known from DE-A 42 22 227 a conical zone having a width of 90 mm is examined, in the arrangement described herein two semi-conical zones, having a width of 90 mm each in the plane 46 of FIG. 1 and adjoining one another therein, can be examined at the same time.

FIG. 6 shows a particularly attractive embodiment of the invention. Therein, four detectors 431 to 434 are provided and the primary diaphragm device comprises eight semi-annular slit apertures in a primary diaphragm plate 401. The detectors 431 to 434 are arranged in the detector plane 42 in such a manner that their annular elements concentrically surround a respective point of intersection of two beam axes extending through a respective X-ray source 20, 30. These points of intersection are chosen so that in the plane 46 the eight semi-conical primary radiation beams 221 to 224 and 321 to 324 directly adjoin one another in an offset manner.

Figure 7:
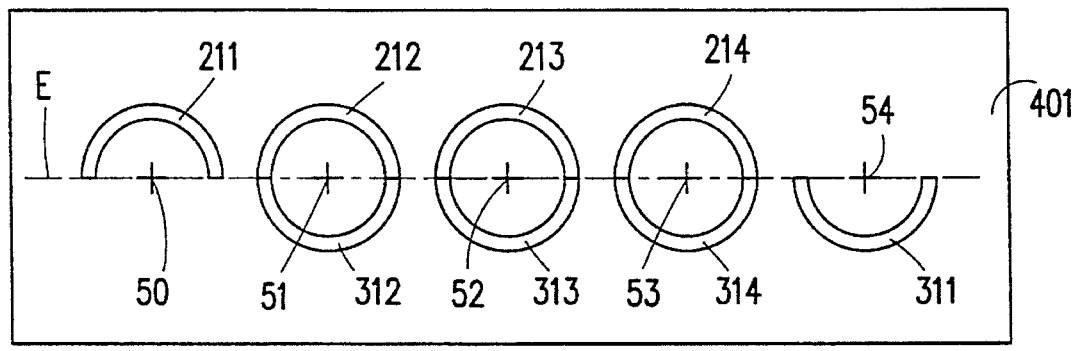
FIG. 7 shows a primary diaphragm plate for an arrangement comprising four detectors.

The primary diaphragm plate 401 shown in FIG. 7 comprises eight semi-annular slit apertures, three slit apertures 212 to 214 which are associated with the X-ray source 20 (not shown) adjoining exactly three slit apertures 312 to 314 which are associated with the X-ray source 30, so that three circular slit apertures are formed. The two extreme semi-annular slit apertures 211 and 311 do not adjoin a second semi-annular slit aperture associated with the respective other X-ray source. The points 51 to 53 are points of intersection of two beam axes, extending through a respective X-ray source 20, 30, and at the same time center points of the three circular slit apertures 212/312 to 214/314. Each time only one beam axis through one of the X-ray sources 20, 30 extends through the points 50 and 54.

Figure 5:
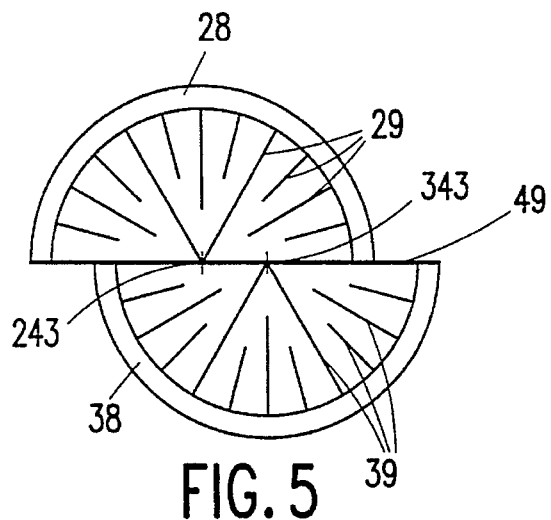
FIG. 5 shows an embodiment of a collimator device.

FIG. 6 does not show the secondary diaphragm devices and the collimator devices which are constructed in the same way as shown in the FIGS. 3 and 5, respectively, be it that in this case four of such devices are arranged between the object 44 to be examined and the detector plane 42. With each pair of primary radiation beams 221, 321 to 224, 324 there are associated at least two semi-annular secondary slit apertures as shown in FIG. 3 and two collimator devices as shown in FIG. 5.

In this embodiment the zone which can be examined simultaneously is widened by approximately a factor of eight in comparison with the arrangement known from DE-A 42 22 227. The width of 700 mm, being the upper limit as regards the width of a piece of luggage to be examined, is thus achieved and the meander-like scanning motion for the temporally successive examination of all zones of the object can be replaced by a one-dimensional scanning motion during which the object to be examined need only be linearly displaced in one direction with respect to the examination arrangement. This also reduces the complexity of the movement device, for example a conveyor belt, and offers a substantial gain in time of approximately a factor of eight. Whereas in the known arrangement the examination of a large piece of luggage requires as much as approximately twenty seconds, in this embodiment of the invention the time required for the examination of an object is substantially less than the envisaged time of six seconds.

Figure 8:
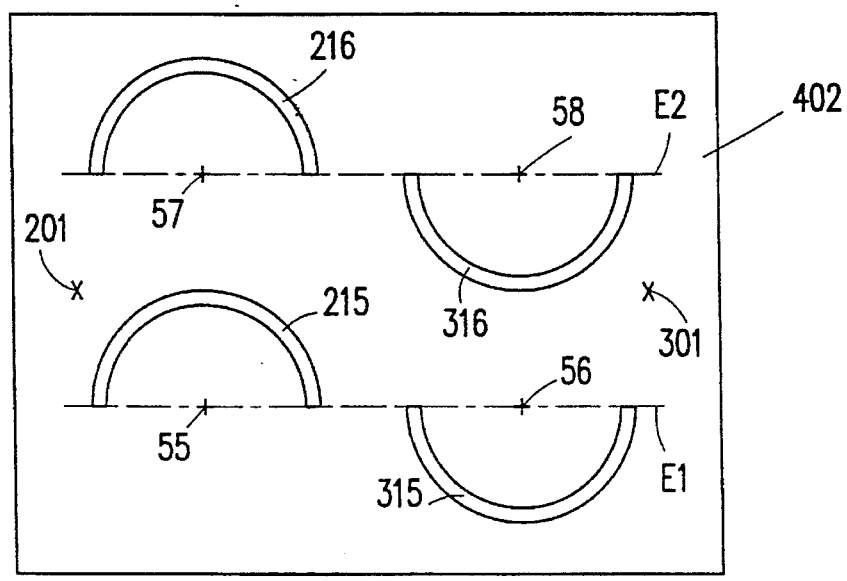
FIG. 8 shows an alternative embodiment of the primary diaphragm plate for an arrangement comprising two detectors.

FIG. 8 shows a further feasible embodiment of a primary diaphragm plate 402. The references 55 and 57 denote the points of intersection of two beam axes extending through the X-ray source 20 (not shown), with the primary diaphragm plate 402, and the references 56 and 58 denote the points of intersection of two beam axes which extend through the X-ray source 30 (not shown either). The positions of the X-ray sources 20 and 30 normal to and at a distance from the primary diaphragm plate 402 are denoted by the points 201 and 301 obtained on the primary diaphragm plate 402 by projecting the positions of the X-ray sources 20 and 30 perpendicularly. The beam axes extending through the points of intersection 55 and 56 and a respective one of the X-ray sources are situated in the plane denoted by E1. Similarly, the beam axes extending through the points of intersection 57 and 58 and a respective one of the X-ray sources are situated in the plane denoted by E2. The scattered radiation of the primary radiation beam formed by the semi-annular slit apertures 215 and 315 is guided to a first detector via a secondary diaphragm device (not shown) and the scattered radiation of the primary radiation beam formed by the slit apertures 216 and 316 is guided to a second detector.

In this embodiment, the simultaneously irradiated examination zone is not only widened in one direction, but also enlarged in a direction perpendicular thereto. In another version of this embodiment the semi-annular slit apertures can be arranged in such a manner that the angle enclosed by a straight line extending perpendicularly to the primary diaphragm plate 402 and through the X-ray source with respect to a primary beam of X-rays emanating from this X-ray source amounts to no more than 15°.

As in the arrangement known from DE-A 42 22 227, at the points of intersection of the beam axes with the primary and secondary diaphragm devices in the arrangement of the invention there may also be provided small bores enabling measurement of the intensity of a so-called central ray, of each semi-conical primary radiation beam, whose path corresponds to the path of the beam axis. To this end, within the innermost detector ring in each detector a small area is designated as a measuring area. These measurements serve to normalize the measuring results of the individual detector elements to the measuring result of the central ray and thus take into account the absorption of the radiation in the examination zone.

Furthermore, the secondary diaphragm device may also consist of a plurality of flat secondary diaphragm plates provided with essentially semi-annular slit apertures.

I claim:

1. An arrangement for measuring the pulse transfer spectrum of elastically scattered X-ray quanta from an examination zone, comprising an X-ray source for generating polychromatic X-rays, a detector which detects the scattered X-ray quanta and which comprises a plurality of annular detector elements which concentrically enclose a detector centre in a detector plane, a primary diaphragm device which is arranged between the X-ray source and the examination zone irradiated by the X-rays and which comprises a primary slit aperture for forming a primary radiation beam, a secondary diaphragm device which is arranged between the examination zone and the detector and which comprises at least one secondary slit aperture, the primary and secondary slit apertures having essentially a semi-annular shape and being arranged coaxially with respect to a beam axis connecting the X-ray source and the detector centre, characterized in that there is provided a second X-ray source which is situated at substantially the same distance from the detector plane as the first X-ray source and is arranged in such a manner that a second beam axis which connects the second X-ray source and the detector centre intersects said first beam axis at an angle and constitutes a pair of beam axes in conjunction therewith, that with both beam axes there are associated primary and secondary slit apertures, and that all primary and secondary slit apertures extending around the first beam axis open towards the plane defined by the pair of beam axes in the opposite direction in comparison with the primary and secondary slit apertures extending around the second beam axis, both ends of each semi-annular slit aperture being situated approximately in the plane defined by the pair of beam axes.

2. An arrangement as claimed in claim 1, characterized in that the diameters of the primary slit apertures are chosen so that the first primary radiation beam, formed by primary slit apertures extending around the first beam axis, in the examination zone adjoins the second primary radiation beam, formed by primary slit apertures extending around the second beam axis.

3. An arrangement as claimed in claim 2, characterized in that the primary and/or the secondary slit apertures are provided in a respective single, flat diaphragm plate.

4. An arrangement as claimed in claim 1, characterized in that the secondary slit apertures are arranged so that the scattered radiation of the first primary radiation beam, scattered essentially in a plane of the examination zone which extends parallel to the detector plane, is incident on the same annular element of a detector as the scattered radiation of the second primary radiation beam which is scattered in the same plane in the examination zone.

5. An arrangement as claimed in claim 1, characterized in that two collimator devices which are associated with a respective beam axis and which comprise lamellae which absorb X-rays and are situated in planes containing a beam axis are arranged between the examination zone and the detector.

6. An arrangement as claimed in claim 5, characterized in that the lamellae of the two collimator devices are separated from one another by a metallic partition which extends in a plane in which the two beam axes are situated.

7. An arrangement as claimed in claim 1, characterized in that it comprises at least one further detector and that the primary diaphragm device comprises two slit apertures for each detector.

8. An arrangement as claimed in claim 7, characterized in that all primary and secondary slit apertures and all detectors are arranged in such a manner that all beam axes connecting the two X-ray sources to the detector centers are situated in a single plane.

9. An arrangement as claimed in claim 8, characterized in that it comprises four detectors and that the primary diaphragm device comprises eight slit apertures.

10. An arrangement as claimed in claim 1, characterized in that the primary and/or the secondary slit apertures are provided in a respective single, flat diaphragm plate.

\* \* \* \* \*